United States Patent [19]

Bee

[11] Patent Number: 5,603,527
[45] Date of Patent: Feb. 18, 1997

[54] SHOULDER BELT MOUNTING ASSEMBLY

[75] Inventor: Anthony H. Bee, Royal Oak, Mich.

[73] Assignee: General Motors Corporation, Detroit, Mich.

[21] Appl. No.: 441,265

[22] Filed: May 15, 1995

[51] Int. Cl.$^6$ ................................................ B60R 22/00
[52] U.S. Cl. .................. 280/808; 280/801.1; 280/801.2; 297/483
[58] Field of Search ............................ 280/801.1, 801.2, 280/808, 804; 297/468, 486, 483

[56] References Cited

U.S. PATENT DOCUMENTS

| | | |
|---|---|---|
| 4,491,344 | 1/1985 | Fohl . |
| 4,547,018 | 10/1985 | Cunningham . |
| 4,667,982 | 5/1987 | Volk et al. . |
| 4,840,403 | 6/1989 | Escaravage . |
| 4,966,393 | 10/1990 | Tokugawa . |
| 4,989,901 | 2/1991 | Adomeit . |
| 5,037,135 | 8/1991 | Kotikovsky et al. . |
| 5,207,452 | 5/1993 | Collins . |
| 5,215,332 | 1/1993 | De Sloovere . |

FOREIGN PATENT DOCUMENTS

WO92/10385  6/1992  WIPO .

Primary Examiner—Eric D. Culbreth
Attorney, Agent, or Firm—Kathryn A. Marra; Howard N. Conkey

[57] ABSTRACT

A shoulder belt mounting assembly includes a mounting bracket attached to the vehicle and having a transversely extending arcuate bearing surface. The assembly further includes a pivot clip having a belt-receiving portion through which the shoulder belt webbing is routed and having a mounting portion adapted for snap-fitted engagement onto the mounting bracket. The mounting portion of the pivot clip includes a transversely extending arcuate pivot surface seated atop and slidably engaging the arcuate bearing surface of the mounting bracket when the pivot clip is mounted on the mounting bracket such that the pivot clip freely transversely pivots relative the mounting bracket. Thus, facile pivotal movement of the shoulder belt webbing relative the vehicle is permitted by the transverse pivotal movement of the pivot clip relative the mounting bracket.

5 Claims, 2 Drawing Sheets

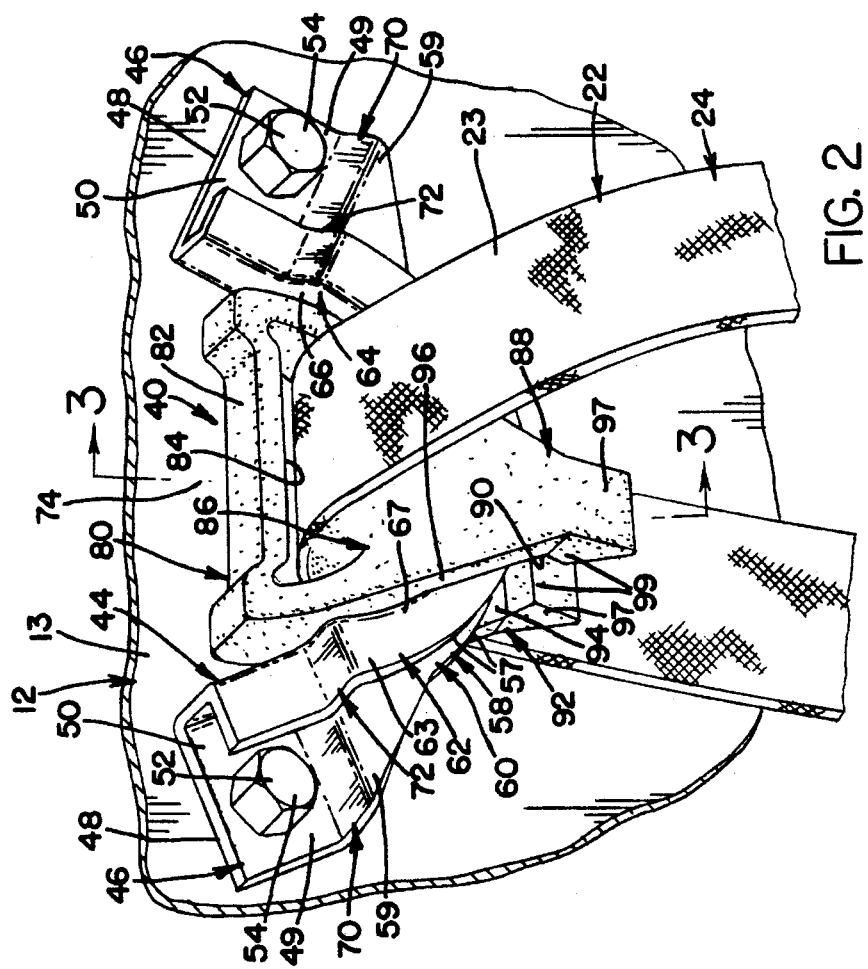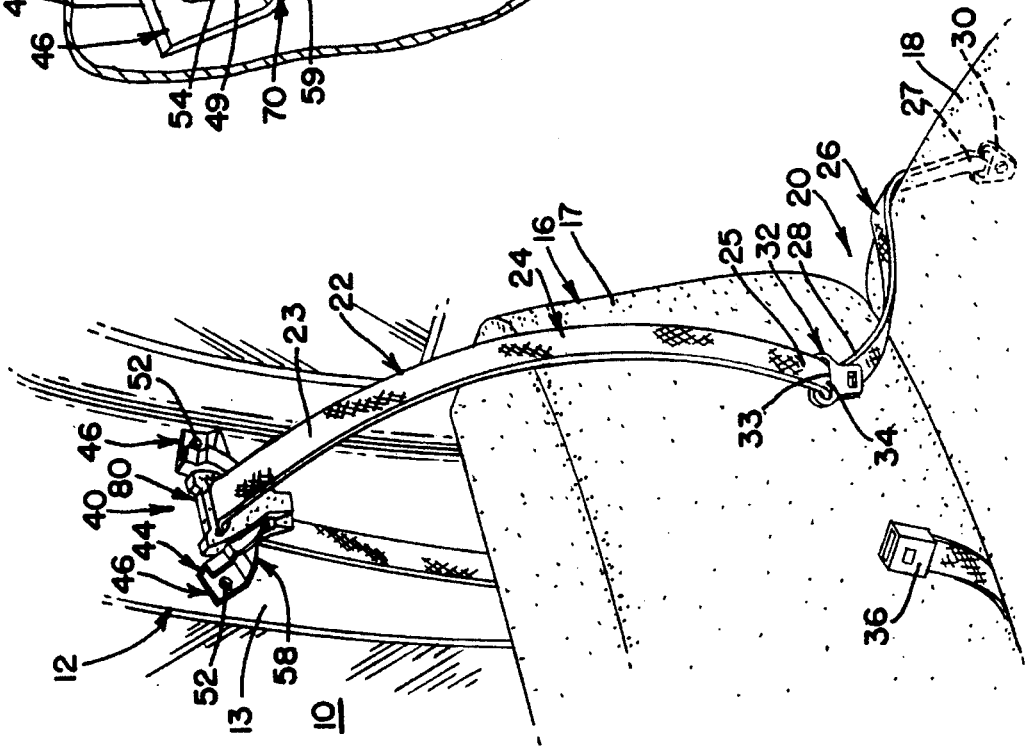

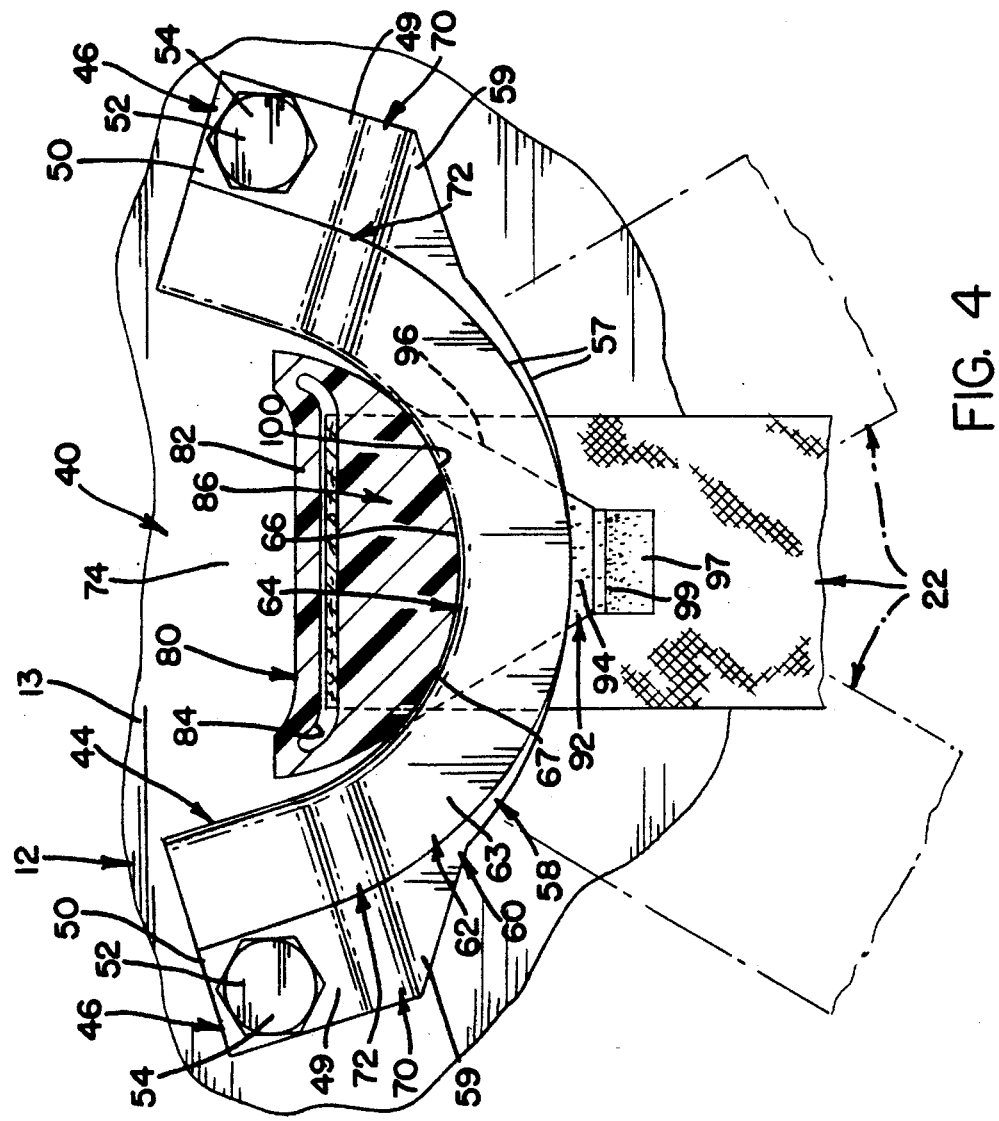

SHOULDER BELT MOUNTING ASSEMBLY

This invention relates to a lap-shoulder seat belt assembly, and more particularly, to an assembly for pivotally mounting a shoulder belt webbing relative a vehicle.

BACKGROUND OF THE INVENTION

It is well known in motor vehicles to provide a combination lap-shoulder seat belt assembly including a shoulder belt webbing for extending across the torso of an occupant and a lap belt webbing for extending generally horizontally across the lap of the occupant. Typically, the lap-shoulder seat belt assembly includes a triangular-shaped bracket, hereinafter referred to as a D-ring, which is pivotally mounted to the vehicle body by a nut and a relatively large shoulder bolt cantilevered outwardly from the vehicle. The bolt must be sufficiently strong to anchor the D-ring during a sudden vehicle deceleration. In addition, the bolt must be sufficiently elongate to axially space the D-ring away from the vehicle body to allow the entire D-ring to pivot about the bolt.

The D-ring is secured at a location proximate an upper portion of a vehicle seat. The shoulder belt webbing is routed through a slot in the D-ring and held relative the vehicle body by the D-ring. During normal vehicle use, the entire D-ring pivots about the bolt to allow adjustment of the angle of the shoulder belt webbing across the torso of various occupants seated in the vehicle.

This typical D-ring arrangement requires a relatively large, long, heavy bolt secured by an appropriate nut. The D-ring and bolt are typically made of a metal material, such as steel. The shoulder belt webbing and lap belt webbing are typically preassembled and delivered to the vehicle assembly location with the D-ring, a latch plate, an anchor plate, and a retractor mechanism already securely attached to the lap and shoulder belt webbing. The D-ring, anchor plate, and retractor mechanism are each then suitably attached to the vehicle during vehicle assembly. Thus, when the D-ring is bolted to the vehicle body, all of the other components of the lap-shoulder belt assembly must be handled at the same time.

SUMMARY OF THE INVENTION

This invention provides an improved assembly for pivotally mounting a shoulder belt webbing relative the vehicle which has reduced mass, is easy to assemble, and provides for greater distribution of forces into the vehicle. The invention allows flexibility in the order of assembly such that the shoulder belt webbing may advantageously be assembled to the vehicle later in the vehicle assembly process by snap-fitted attachment without the use of fasteners. This invention further provides an improved assembly for mounting the shoulder belt webbing characterized by ease of pivotal movement of the shoulder belt webbing.

This is accomplished in the present invention by providing an assembly including a mounting bracket attached to the vehicle and having a transversely extending arcuate bearing surface. The assembly further includes a pivot clip having a belt-receiving portion through which the shoulder belt webbing is routed and having a mounting portion adapted for snap-fitted engagement onto the mounting bracket. The mounting portion of the pivot clip includes a transversely extending arcuate pivot surface seated atop and slidably engaging the arcuate bearing surface of the mounting bracket when the pivot clip is mounted on the mounting bracket such that the pivot clip freely transversely pivots relative the mounting bracket. Thus, facile pivotal movement of the shoulder belt webbing relative the vehicle is permitted by the transverse pivotal movement of the pivot clip relative the mounting bracket.

In a preferred form of the invention, the mounting bracket includes bent portions for spacing the arcuate bearing surface apart from the vehicle to define a passageway between the arcuate bearing surface of the mounting bracket and the vehicle. In addition, the belt-receiving portion of the pivot clip includes a transversely elongated slot and the seat belt webbing extends through the passageway, through the slot of the pivot clip, and over the mounting bracket when the pivot clip is mounted on the mounting bracket. The mounting bracket preferably has transversely opposed end mounting portions abutting and attached to the vehicle between which the arcuate bearing surface is positioned such that a force transmitted from the shoulder belt webbing to the mounting bracket via the pivot clip is distributed into the vehicle at two locations by the end mounting portions, instead of a single location as with the D-ring arrangement of the prior art.

BRIEF DESCRIPTION OF THE DRAWINGS

An embodiment of the present invention is described below, by way of example only, with reference to the accompanying drawings in which:

FIG. 1 is a perspective view of a vehicle interior partially-broken-away and showing a lap-shoulder seat belt assembly having an assembly for mounting the shoulder belt webbing according the present invention;

FIG. 2 is a view similar to FIG. 1, but showing an enlarged view of the assembly for mounting the shoulder belt webbing;

FIG. 3 is a sectional view taken along line 3—3 of FIG. 2; and

FIG. 4 is a sectional view taken along line 4—4 of FIG. 3 and showing various pivotal positions of the shoulder belt webbing in phantom lines.

DESCRIPTION OF THE PREFERRED EMBODIMENT

Referring to FIGS. 1 and 3, it is seen that a vehicle includes a vehicle interior 10 including an inwardly facing vehicle wall 12 having a inboard side 13 and an outboard side 14. The vehicle wall 12 is preferably made of sheet metal and may also include appropriate overlying trim (not shown). The vehicle interior 10 further includes a rear seat 16 for an occupant (not shown) including an upper seat back 17 and a lower seat cushion 18. A lap-shoulder seat belt assembly 20 includes a lap-shoulder belt webbing 22 having a shoulder belt webbing portion 24 for extending across a torso of the occupant and a lap belt webbing portion 26 for extending generally horizontally across a lap of the occupant. The lap belt webbing 26 includes an anchor end 27 secured to an anchor plate 30 and an opposite latching end 28 slidably connected to a latch plate 32. The anchor plate 30 is suitably anchored to the vehicle during vehicle assembly. The shoulder belt webbing 24 includes a retractor end (not shown) secured to a retractor mechanism (not shown) and an opposite latching end 25 slidably connected to the latch plate 32. The retractor mechanism is suitably anchored to the vehicle during vehicle assembly. The shoulder belt webbing 24 further includes an intermediate portion 23 positioned between the latching end 25 and the retractor end.

The latch plate 32 is located at a junction 34 formed by the intersection of the latching end 25 of the shoulder belt webbing 24 and the latching end 28 of the lap belt webbing 26. The lap-shoulder belt webbing 22 is preferably routed through an aperture 33 in the latch plate 32 and slidable relative to the shoulder belt webbing 24 and lap belt webbing 26 such that the junction 34 location may be adjusted for the size of the occupant. The latch plate 32 is releasably connectable to a buckle assembly 36 anchored to the vehicle.

A shoulder belt mounting assembly 40 pivotally mounts the intermediate portion 23 of the shoulder belt webbing 24 relative the vehicle at a location proximate the upper seat back 17 of the seat 16. The mounting assembly 40 generally includes a curved mounting bracket 44 attached to the vehicle and a pivot clip 80 pivotally mounted on the mounting bracket 44.

The generally curved mounting bracket 44 is preferably stamped from a single piece of metal and includes transversely opposed end mounting portions 46 each having a generally flat configuration and each having a rearward face 48 abutting the inboard side 13 of the vehicle wall 12 and an opposite forward face 50. The end mounting portions 46 directly abut the vehicle wall 12 and are anchored to the vehicle preferably by relatively short bolts 52 extending through both the end mounting portions 46 and the vehicle wall 12. The bolts 52 have heads 54 abutting the forward faces 50 of the end mounting portions 46 and are secured by nuts 56 abutting the outboard side 14 of the vehicle wall 12. It will be appreciated that the attachment of the end mounting portions 46 to the vehicle wall 12 by the use of bolts 52 and nuts 56 is merely exemplary and many other fastening methods may be used to mount the mounting bracket 44 to the vehicle wall 12, such as screws, rivets, expandable fasteners, or directly welding the end mounting portions 46 to the sheet metal forming the vehicle wall 12.

The mounting bracket 44 further includes a central curved portion 58 transversely extending between the end mounting portions 46. As best shown in FIG. 3, the central curved portion 58 of the mounting bracket 44 has an upside down U-shaped cross-section having a vertically oriented rearward member 60 proximate the vehicle wall 12, a vertically oriented forward member 62 parallel to and spaced apart from the rearward member 60, and an upper member 64 interconnecting the rearward member 60 to the forward member 62. The forward member 62 of the mounting bracket 44 has a first outer surface 63 and the rearward member 60 of the mounting bracket 44 has a second outer surface 61. The upper member 64 of the central curved portion 58 of the mounting bracket 44 defines a generally upwardly facing central arcuate bearing surface 66. The arcuate bearing surface 66 extends continuously normal to the forward and rearward members 62, 60 of the central curved portion 58. The arcuate bearing surface 66 includes a forward edge 67 and a rearward edge 68 from which the forward and rearward members 62, 60 downwardly depend, respectively.

As best shown in FIGS. 2 and 3, the rearward member 60 and upper member 64 including the arcuate bearing surface 66 of the central curved portion 58 of the mounting bracket 44 are spaced longitudinally forward and apart from the vehicle wall 12 as enabled by forwardly bent portions 70 of the mounting bracket 44 extending between a lower edge 49 of each of the end mounting portions 46 and an upper edge 59 of the rearward member 60 of the central curved portion 58. The mounting bracket 44 further includes forwardly angled pieces 72 extending from the arcuate bearing surface 66 and the forward member 62.

A vertical passageway 74 is defined between the inboard side 13 of the vehicle wall 12 and the rearward member 60 and arcuate bearing surface 66 of the central curved portion 58 of the mounting bracket 44 when the mounting bracket 44 is mounted to the vehicle wall 12. The mounting bracket 44 has sufficient transverse width and the bent portions 70 of the mounting bracket 44 are bent sufficiently longitudinally forward away from the inboard side 13 of the vehicle wall 12 such that the defined passageway 74 is transversely and longitudinally sized for closely receiving the anchor plate 30, latch plate 32, and pivot clip 80 entirely therethrough, as will be described further hereinafter. In addition to spacing the central curved portion 58 of the mounting bracket 44 from the vehicle wall 12, the bent portions 70 also function as stop surfaces which limit the pivotal movement of the pivot clip 80 on the mounting bracket 44.

The pivot clip 80 is preferably of one-piece construction and molded from a polymeric or nylon material. The pivot clip 80 includes an upper belt-receiving portion 82 having a vertically narrow, transversely elongated slot 84 sized for closely receiving the shoulder belt webbing 24 therethrough. The shoulder belt webbing 24 extends through the slot 84 and is freely slidable relative to the slot 84 in a direction towards and away from the occupant for adjusting the length of the shoulder belt webbing 24.

The pivot clip 80 further includes a lower mounting portion 86 adapted for snap-fitted engagement with the central curved portion 58 of the mounting bracket 44. The mounting portion 86 of the pivot clip 80 includes forward and rearward downwardly projecting flexible leg portions 88, 92 having a first inner surface 90 and a second inner surface 94, respectively. The forward and rearward legs 88, 92 are longitudinally spaced apart from each other and depend downwardly from opposite sides of an arcuate pivot surface 100 of the mounting portion 86 of the pivot clip 80, as described further below. The forward and rearward legs 88, 92 each have an upper end 96 and a lower free end 97.

The generally downwardly facing arcuate pivot surface 100 of the pivot clip 80 is transversely elongated and extends normal to and interconnects the upper ends 96 of the forward and rearward legs 88, 92. The arcuate pivot surface 100 of the pivot clip 80 preferably has a curved shape complementary with the curved shape of the arcuate bearing surface 66 of the mounting bracket 44 to enable surface 100 to surface sliding engagement of the arcuate pivot surface 100 of the pivot clip 80 on the arcuate bearing surface 66 of the mounting bracket 44 back and forth in the transverse direction. Preferably, in a relaxed position unassembled to the mounting bracket 44, the lower free ends 97 of the legs 88, 92 of the pivot clip 80 are spaced closer together than the upper ends 96 of the legs 88, 92 such that the legs 88, 92 are inwardly biased towards each other for snap-fitted engagement with the mounting bracket 44 when mounted thereto.

The free ends 97 of the longitudinally flexible forward and rearward legs 88, 92 are biased towards each other for snap-fittedly capturing the central curved portion 58 of the mounting bracket 44 therebetween. The legs 88, 92 are each preferably tapered in the transverse direction such that the upper ends 96 of the legs 88, 92 are transversely wider than the lower free ends 97 of the legs 88, 92 to impart greater flexibility to the lower free ends 97 of the legs 88, 92. The inner surfaces 90, 94 of the legs 88, 92 each include an inwardly projecting tab 99 which prevents vertical movement of the pivot clip 80 relative the mounting bracket 44. The legs 88, 92 each have sufficient vertical length such that the tabs 99 on the free ends 97 of the legs 88, 92 extend below circumferential edges 57 of the central curved portion 58 of the mounting bracket 44 when the pivot clip 80 is mounted on the mounting bracket 44 to vertically trap the pivot clip 80 on the mounting bracket 44.

The lap-shoulder seat belt assembly 20 including the shoulder belt mounting assembly 40 is assembled to the vehicle as follows. The end mounting portions 46 of the mounting bracket 44 of the mounting assembly 40 are each abutted against and attached directly to the vehicle wall 12, such as by bolts 52 secured by nuts 56. When the mounting bracket 44 is attached to the vehicle wall 12, the vertical passageway 74 is defined between the mounting bracket 44 and the vehicle wall 12.

The lap-shoulder seat belt assembly 20 is received at the vehicle assembly location with the retractor mechanism preassembled to the retractor end of the shoulder belt webbing 24, the anchor plate 30 preassembled to the anchor end 27 of the lap belt webbing 26, and the latch plate 32 preassembled to the junction 34 of the lap belt webbing 26 and shoulder belt webbing 24. In addition, the pivot clip 80 has been preassembled to the intermediate portion 23 of the shoulder belt webbing 24 at a location between the latch plate 32 and the retractor mechanism by routing the shoulder belt webbing 24 through the slot 84 of the pivot clip 80, thus connecting the pivot clip 80 to the shoulder belt webbing 24 such that the pivot clip 80 is slidable relative to the shoulder belt webbing 24. It will be appreciated that the pivot clip 80 can advantageously be slid through the slot 84 of the pivot clip 80 without regard to the forward or rearward orientation of the legs 88, 92.

The retractor mechanism is mounted to the vehicle behind the seat 16 in a well-known manner. The lap-shoulder belt webbing 22 including the attached anchor plate 30, latch plate 32, and pivot clip 80 are all threaded up through the passageway 74 defined between the mounting bracket 44 and the vehicle wall 12 after which the anchor plate 30 may be suitably attached to the vehicle and the latch plate 32 may be releasably connected to the buckle assembly 36.

The pivot clip 80 is pivotally mounted atop the mounting bracket 44 to complete the shoulder belt mounting assembly 40 as follows. After the pivot clip 80 is threaded up through the passageway 74 with the shoulder belt webbing 24 extending through the slot 84, the pivot clip 80 is held above the central curved portion 58 of the mounting bracket 44 with the free ends 97 of the forward and rearward legs 88, 92 vertically aligned above the forward and rearward members 62, 60 of the central curved portion 58 of the mounting bracket 44, respectively. The entire pivot clip 80 is pushed downwardly onto the central curved portion 58 of the mounting bracket 44 such that the first and second inner surfaces 90, 94 of the legs 88, 92 engage the first and second outer surfaces 63, 61 of the forward and rearward members 62, 60 of the mounting bracket 44, respectively, and flex outwardly until the tabs 99 of the free ends 97 of the legs 88, 92 snap-fittedly clip over the circumferential edges 57 of the central curved portion 58 of the mounting bracket 44. Once this occurs, the arcuate pivot surface 100 of the pivot clip 80 is seated atop and slidably engages the arcuate bearing surface 66 of the mounting bracket 44 such that the pivot clip 80 is connected to the mounting bracket 44 and is freely transversely pivotal relative the mounting bracket 44.

When the pivot clip 80 is mounted on the mounting bracket 44, the forward and rearward legs 88, 92 of the pivot clip 80 are inwardly biased towards the forward and rearward members 62, 60 of the central curved portion 58 of the mounting bracket 44, respectively, yet slidable relative thereto. Advantageously gravity and tension on the shoulder belt webbing 24 by the occupant cooperatively maintain the arcuate pivot surface 100 of the pivot clip 80 in engagement with the arcuate bearing surface 66 of the mounting bracket 44 when the pivot clip 80 is mounted on the mounting bracket 44. In the assembled condition, the inwardly projecting tabs 99 on the free ends 97 of the legs 88, 92 prevent vertical removal of the pivot clip 80 from the mounting bracket 44.

However, the pivot clip 80 is removable from the mounting bracket 44 by applying an outward force on each of the legs 88, 92 such that the tabs 99 can clear the central curved portion 58 of the mounting bracket 44 and the pivot clip 80 can be moved upwardly for removal from the mounting bracket 44. Advantageously, the components of the lap-shoulder seat belt assembly 20 can be serviced without requiring removal of the mounting bracket 44, as compare with the prior art D-ring which must be removed. Instead, the pivot clip 80 can simply be snapped off and the anchor plate 30 can be removed and threaded back out through the passageway 74.

It will be appreciated that the pivot clip 80 may be mounted to the mounting bracket 44 either before or after attachment of the retractor mechanism and anchor plate 30 to the vehicle.

In the assembled condition as best shown in FIG. 3, the forward and rearward legs 88, 92 of the pivot clip 80 are parallel and slidable relative to the forward and rearward members 62, 60 of the mounting bracket 44, respectively. In addition, the arcuate pivot surface 100 of the pivot clip 80 is seated atop and slidably engages the arcuate bearing surface 66 of the mounting bracket 44. The arcuate pivot surface 100 and the arcuate bearing surface 66 extend normal to the forward and rearward legs 88, 92 and the forward and rearward members 62, 60, respectively. Thus, the engagement of the forward and rearward legs 88, 92 of the pivot clip 80 with the forward and rearward members 62, 60 of the mounting bracket 44 prevent pivotal movement of the pivot clip 80 relative the mounting bracket 44 in a direction normal to the transverse pivotal direction.

In the assembled condition, the arcuate pivot surface 100 of the pivot clip 80 is free to transversely slide along the arcuate bearing surface 66 of the mounting bracket 44 as best shown in FIG. 4. It will be appreciated that the pivot clip 80 transversely pivots about a remote pivot axis Z defined by the intersection of lines drawn normal to the arcuate bearing surface 66 of the mounting bracket 44 in a vertical plane. Thus, the pivot clip 80 freely transversely pivots about the remote pivot axis Z rather than being limited to pivotal movement about a single pivot point as in the D-rings of the prior art. The pivot clip 80 freely transversely pivots back and forth on the mounting bracket 44 to enable facile pivotal movement of the shoulder belt webbing 24 by the occupant to accommodate various shoulder belt webbing 24 angles required by variations in occupant size and seat adjustment and movement by the occupant especially when latching and unlatching the latch plate 32 to the buckle assembly 36.

It will further be appreciated that this particular mounting assembly 40 may improve the lap-shoulder seat belt assembly 20 comfort since less force is required to maintain the shoulder belt webbing 24 at a given angle relative the vehicle since the pivot clip 80 is lighter and requires less force to pivot than the prior art D-ring type arrangement.

As best shown in FIG. 4, transverse pivotal movement of the pivot clip 80 on the mounting bracket 44 will be limited by engagement of the legs 88, 92 of the pivot clip 80 with the bent portions 70 of the mounting bracket 44.

When the vehicle experiences a predetermined amount of deceleration, the shoulder belt webbing 24 and lap belt webbing 26 are loaded in tension by the occupant. The shoulder belt webbing 24 transfers the force to the pivot clip 80 which transfers the force to the mounting bracket 44 which distributes the force directly into the vehicle via the two end mounting portions 46 of the mounting bracket 44. Advantageously, the end mounting portions 46 abutting the vehicle wall 12 directly transmit the force into the vehicle and distribute the force over two locations. It will be appreciated that this arrangement is advantageous over the prior art D-ring arrangement since the D-ring applies a cantilevered load on a bolt which is mounted to a single point on the vehicle. Accordingly, the bolts 52 utilized in the present invention may be a smaller size and thus lighter than the single large cantilevered mounting bolt typically used in the prior art for potential mass savings. In addition, the end mounting portions 46 of the mounting bracket 44 may be welded directly to the vehicle wall 12 to incur further mass savings which cannot be accomplished with the prior art D-ring arrangement that requires a large bolt to pivot. Also advantageously, the pivot clip 80 may be snapped onto the mounting bracket 44 later in the vehicle assembly after the mounting bracket 44 has already been attached to the vehicle. Thus, the snap-on pivot clip 80 enables flexibility and ease of assembly.

It will be understood that a person skilled in the art may make modifications to the embodiments shown herein within the scope and intent of the claims.

For example, the sheet metal of the vehicle wall 12 is merely an example of where the mounting bracket 44 can be mounted. The mounting bracket 44 could also be mounted to the vehicle by being mounted to a sufficiently strong upper seat back, rear shelf, side structure, roof or any other sufficiently strong portion of the vehicle. It is also contemplated that interior trim pieces may be used to cover the vehicle wall 12 and portions of the mounting bracket 44. Although the drawings illustrate the rear seat 16 of a vehicle, the mounting assembly 40 is equally useful in front or rear seat lap-shoulder seat belt assemblies 20.

Although the preferred embodiment shows the mounting bracket 44 as a separate piece from the vehicle wall 12, it will be appreciated that the mounting bracket 44 could also be an integral stamped out portion of the vehicle wall 12 with the end mounting portions 46 integrally attached to the vehicle wall 12.

Thus, the mounting assembly 40 of the present invention provides a unique way to mount the shoulder belt webbing 24 of the lap-shoulder seat belt assembly 20 relative the vehicle and is characterized by flexibility in assembly order, reduction in mass, and ease of pivotal movement of the shoulder belt webbing 24 by transverse pivotal movement of the pivot clip 80.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. A method of assembling a mounting assembly for mounting a shoulder belt webbing relative a vehicle, the assembly including a mounting bracket and a pivot clip through which the shoulder belt webbing is routed, the pivot clip having downwardly projecting flexible portions, the method comprising the steps of:

attaching the mounting bracket to the vehicle to define a passageway between the vehicle and the mounting bracket;

threading the shoulder belt webbing and pivot clip up through the passageway and over the mounting bracket; and snapping the projecting portions of the pivot clip over the mounting bracket to seat the pivot clip atop the mounting bracket.

2. A mounting assembly for mounting a shoulder belt webbing relative to a vehicle, the assembly comprising:

a mounting bracket attached to the vehicle and including a transversely extending arcuate bearing surface, the mounting bracket including bent portions for spacing the arcuate bearing surface apart from the vehicle to define a passageway between the arcuate bearing surface of the mounting bracket and the vehicle, the passageway being sized for closely receiving the pivot clip therethrough; and a pivot clip having a belt-receiving portion through which the shoulder belt webbing is routed and having a mounting portion adapted for snap-fitted engagement onto the mounting bracket, the mounting portion of the pivot clip including a transversely extending arcuate pivot surface seated atop and slidably engaging the arcuate bearing surface of the mounting bracket when the pivot clip is mounted on the mounting bracket such that the pivot clip freely transversely slides relative to the mounting bracket, the pivot clip including spaced apart, opposing, downwardly projecting flexible portions depending from the arcuate pivot surface for snap-fittedly engaging with the mounting bracket to mount the pivot clip on the mounting bracket, at least one of the projecting portions extending through the passageway when the pivot clip is mounted on the mounting bracket;

whereby facile pivotal movement of the shoulder belt webbing relative to the vehicle is permitted by the transverse sliding movement of the pivot clip relative to the arcuate bearing surface of the mounting bracket.

3. The assembly of claim 2 wherein the projecting portions have an upper transverse width greater than a lower transverse width.

4. The assembly of claim 2 wherein the projecting portions of the pivot clip are adapted for engaging the bent portions of the mounting bracket to limit transverse pivotal movement of the pivot clip relative to the mounting bracket.

5. A mounting assembly for mounting a shoulder belt webbing relative a vehicle, the assembly comprising:

a mounting bracket having end portions abutting and attached to the vehicle, the mounting bracket having a curved portion transversely extending between the end portions and spaced apart from the vehicle to define a passageway between the curved portion and the vehicle, the curved portion including an arcuate bearing surface;

a pivot clip including an upper belt-receiving portion having a transversely elongated slot through which the shoulder belt webbing slidably extends, the pivot clip having a lower mounting portion including an arcuate pivot surface and spaced apart, downwardly projecting portions depending from the arcuate pivot surface, the projecting portions of the pivot clip adapted for snap-fitted engagement with the curved portion of the mounting bracket, the arcuate pivot surface of the pivot clip seated atop and slidably engaging the arcuate bearing surface of the mounting bracket when the pivot clip is assembled to the mounting bracket such that the pivot clip freely transversely slides on the mounting bracket;

the shoulder belt webbing extending through the passageway, through the slot in the pivot clip, and over the mounting bracket when the pivot clip is mounted on the mounting bracket; and the curved portion of the mounting bracket including a rearward edge adjacent the passageway and an opposite forward edge and the mounting bracket including a vertically oriented rearward member depending from the rearward edge and normal to the arcuate bearing surface and a vertically oriented forward member depending from the forward edge and normal to the arcuate bearing surface and one of the projecting portions engaging the rearward member and another of the projecting portions engaging the forward member and the projecting portions being normal to the arcuate pivot surface when the pivot clip is mounted on the mounting bracket whereby pivotal movement of the pivot clip relative to the mounting bracket in a direction normal to the transverse sliding movement is prevented and facile pivotal movement of the shoulder belt webbing relative the vehicle is permitted by the transverse sliding movement of the pivot clip relative to the mounting bracket.

* * * * *